(12) United States Patent
Lee et al.

(10) Patent No.: US 12,293,024 B2
(45) Date of Patent: May 6, 2025

(54) WEARABLE DEVICE

(71) Applicant: Samsung Display Co., LTD., Yongin-si (KR)

(72) Inventors: Cheon Myeong Lee, Yongin-si (KR); Sang Ho Kim, Yongin-si (KR); Soo Min Baek, Yongin-si (KR); Ju Youn Son, Yongin-si (KR); Ji Won Lee, Yongin-si (KR); Bek Hyun Lim, Yongin-si (KR); Ju Hwa Ha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 224 days.

(21) Appl. No.: 18/192,046

(22) Filed: Mar. 29, 2023

(65) Prior Publication Data

US 2023/0409120 A1 Dec. 21, 2023

(30) Foreign Application Priority Data

Jun. 21, 2022 (KR) .................. 10-2022-0075221

(51) Int. Cl.
*G06F 3/01* (2006.01)
*H02P 6/182* (2016.01)

(52) U.S. Cl.
CPC .............. *G06F 3/017* (2013.01); *G06F 3/014* (2013.01); *H02P 6/182* (2013.01)

(58) Field of Classification Search
CPC .......... G06F 3/017; G06F 3/014; G06F 3/015; G06F 3/0346; G06F 3/011; H02P 6/182; G01R 15/18; H04W 4/80
See application file for complete search history.

(56) References Cited

U.S. PATENT DOCUMENTS

| | | | |
|---|---|---|---|
| 11,334,157 B1 * | 5/2022 | Gong ....................... | G06F 3/017 |
| 2015/0182130 A1 * | 7/2015 | Utter ..................... | A61B 5/0024 |
| | | | 600/483 |
| 2018/0024635 A1 | 1/2018 | Kaifosh et al. | |
| 2018/0356890 A1 * | 12/2018 | Zhang ..................... | G06F 3/014 |
| 2019/0212822 A1 * | 7/2019 | Keller .................... | G06F 3/0426 |

FOREIGN PATENT DOCUMENTS

| | | |
|---|---|---|
| KR | 10-2016-0133868 | 11/2016 |
| KR | 10-2018-0066718 | 6/2018 |
| KR | 10-2020-0024324 | 3/2020 |

* cited by examiner

*Primary Examiner* — Phuong H Nguyen
(74) *Attorney, Agent, or Firm* — KILE PARK REED & HOUTTEMAN PLLC

(57) ABSTRACT

A wearable device includes sensing blocks, and a connection member connecting the sensing blocks, the sensing blocks include a first sensing block and a second sensing block connected to the first sensing block by the connection member, and the first sensing block includes an induced electromotive force sensing module, the induced electromotive force sensing module includes a magnetic body, a coil not contacting the magnetic body and facing the magnetic body, a rod attached to the magnetic body and guiding a movement path of the coil, and an induced electromotive force sensor sensing an induced electromotive force generated in the coil by the coil and the magnetic body.

20 Claims, 18 Drawing Sheets

FIG. 16

|  | Motion 1 | Motion 2 | ... | Motion n |
|---|---|---|---|---|
| Sensor 1 | Data[0,0] | Data[1,0] | Data[...,0] | Data[n,0] |
| Sensor 2 | Data[0,1] | Data[1,1] | Data[...,1] | Data[n,1] |
| ... | Data[0,...] | Data[1,...] | Data[...,...] | Data[n,...] |
| Sensor n | Data[0,n] | Data[1,n] | Data[...,n] | Data[n,n] |

WEARABLE DEVICE

CROSS-REFERENCE TO RELATED APPLICATION(S)

This application claims priority to and benefits of Korean Patent Application No. 10-2022-0075221 under 35 U.S.C. § 119, filed on Jun. 21, 2022 in the Korean Intellectual Property Office, the entire contents of which are incorporated herein by reference.

BACKGROUND

1. Technical Field

The disclosure relates to a wearable device.

2. Description of the Related Art

With the development of information technology (IT), a field for a wearable device having an information processing function and worn on the body has been pioneered, and a method of inputting information to the wearable device is being researched. By way of example, gesture recognition technology for inputting information by recognizing a human gesture is being researched, and most current gesture recognition technologies recognize a user's movement based on visual technology, for example, based on an image from a camera. A contact method for recognizing a gesture using a sensor that senses a user's movement is also being researched.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a wearable device capable of sensing an induced electromotive force data value, which changes according to the movement of a user's forearm according to the user's hand and arm motion, through an induced electromotive force sensing module included in each of blocks in contact with the user's forearm and reflecting the user's hand and arm movement in an external electronic device by mapping the induced electromotive force data value.

However, aspects of the disclosure are not restricted to the ones set forth herein. The above and other aspects of the disclosure will become more apparent to one of ordinary skill in the art to which the disclosure pertains by referencing the detailed description of the disclosure given below.

According to an embodiment, a wearable device may include sensing blocks; and a connection member connecting the sensing blocks, wherein the sensing blocks may include a first sensing block; and a second sensing block connected to the first sensing block by the connection member, and the first sensing block may include an induced electromotive force sensing module, the induced electromotive force sensing module may include a magnetic body; a coil not contacting the magnetic body and facing the magnetic body; a rod attached to the magnetic body and guiding a movement path of the coil, and an induced electromotive force sensor sensing an induced electromotive force generated in the coil by the coil and the magnetic body.

In an embodiment, wherein the first sensing block may comprise an upper member, a lower member facing the upper member and side members disposed between the upper member and the lower member, the magnetic body may be attached to a surface of the upper member, and the coil may be attached to a surface of the lower member.

In an embodiment, wherein the upper member may comprise a rigid material, and the lower member and the side members may comprise an elastic material.

In an embodiment, wherein the upper member and the lower member may have a substantially curved shape, and a curvature of the upper member may be different from a curvature of the lower member.

In an embodiment, wherein the first sensing block may further comprise a filling layer defined by the upper member, the lower member, and the side members, and the filling layer may be elastically deformable.

In an embodiment, wherein the filling layer may be filled with a fluid.

In an embodiment, wherein the coil may extend in a longitudinal direction of the rod, the coil does not contact the rod, and the coil surrounds the rod.

In an embodiment, wherein the second sensing block may comprise an inertial sensor that senses an inertial signal, and a control unit receiving a first data value sensed by the induced electromotive force sensor and a second data value sensed by the inertial sensor and outputting a third data value by combining the first data value and the second data value with a pre-stored mapping table.

In an embodiment, a wearable device may further comprise a connection wiring passing through the first sensing block, the connection member, and the second sensing block, wherein the connection wiring may connect the induced electromotive force sensor and the control unit.

In an embodiment, wherein the second sensing block may further comprise a communication unit, and the control unit may transmit the third data value to an external electronic device through the communication unit.

In an embodiment, wherein the coil may move upward or downward according to a contraction or a relaxation of the lower member, and a distance between the magnetic body and the coil changes.

In an embodiment, wherein the rod may be magnetic by contacting the magnetic body, the coil may move upward or downward according to a contraction or a relaxation of the lower member, and an induced electromotive force may be generated in the coil by a change in an area of the rod overlapping the coil.

In an embodiment, wherein the first sensing block may comprise induced electromotive force sensing modules.

In an embodiment, wherein magnetic bodies included in the induced electromotive force sensing modules may be spaced apart from each other in a first direction and a second direction intersecting the first direction and disposed in a matrix in plan view.

In an embodiment, wherein the lower member may contact a user's forearm, and a distance between the magnetic body and the coil may be changed by a contraction or a relaxation of the forearm according to the user's hand or arm movement, and an induced electromotive force may be generated in the coil.

According to an embodiment, a wearable device may include sensing blocks, the sensing blocks may include a first sensing block; and a second sensing block, wherein the first sensing block may include a magnetic body; a coil not contacting the magnetic body and facing the magnetic body; and an induced electromotive force sensor sensing an induced electromotive force generated in the coil by the coil and the magnetic body, the second sensing block may include a control unit, the control unit receives a first data value sensed by the induced electromotive force sensor and outputs a second data value by combining the first data value with a pre-stored mapping table.

In an embodiment, a wearable device may further comprise a connection member connecting the first sensing block and the second sensing block; and a connection wiring passing through the first sensing block, the connection member and the second sensing block and connecting the induced electromotive force sensor and the control unit.

In an embodiment, wherein the control unit may receive the first data value from the induced electromotive force sensor through the connection wiring.

In an embodiment, wherein the second sensing block may further comprise an inertial sensor that senses an inertial signal, and the control unit may receive a third data value sensed by the inertial sensor and outputs a fourth data value by combining the second data value with the third data value.

In an embodiment, wherein the second sensing block further may comprise a communication unit, and the control unit may transmit the fourth data value to an external electronic device through the communication unit.

A wearable device according to an embodiment an induced electromotive force data value, which changes according to the movement of a user's forearm according to the user's hand and arm motion, through an induced electromotive force sensing module included in each of blocks in contact with the user's forearm and reflects the user's hand and arm movement in an external electronic device by mapping the induced electromotive force data value. Therefore, it is possible to reflect detailed movements from the hand to the wrist in the external electronic device. Since the wearable device is worn on the forearm, the movement of the hand may be natural.

However, the effects of the disclosure are not restricted to the ones set forth herein. The above and other effects of the disclosure will become more apparent to one of ordinary skill in the art to which the disclosure pertains and by referencing the claims.

BRIEF DESCRIPTION OF THE DRAWINGS

These and/or other aspects will become apparent and more readily appreciated from the following description of the embodiments, taken in conjunction with the accompanying drawings in which:

FIG. 16 illustrates an example of a mapping table according to an embodiment.

DETAILED DESCRIPTION OF THE EMBODIMENTS

Figure 1:
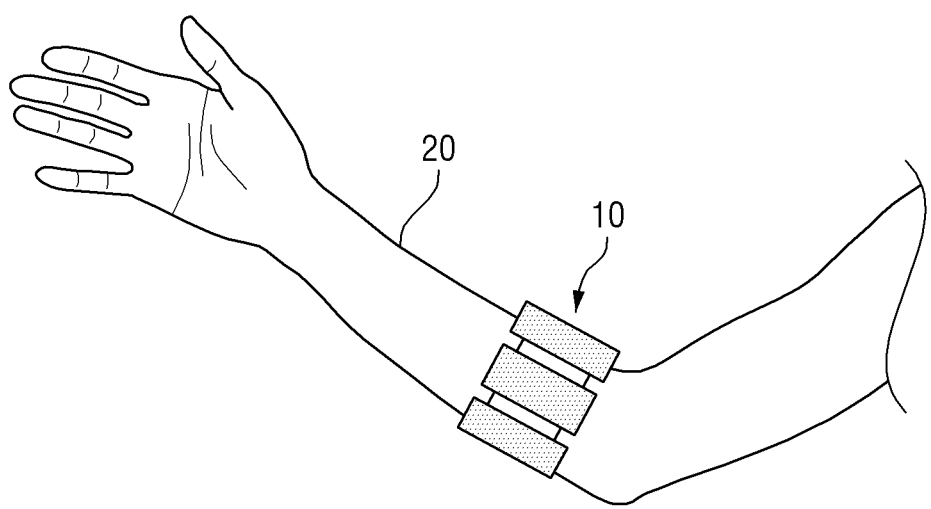
FIG. 1 illustrates a state in which a user wears a wearable device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

For example, it will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Features of each of the various embodiments of the disclosure may be partially or entirely combined with each other and may be technically variously interworked with each other, and respective embodiments may be implemented independently of each other or may be implemented together in association with each other.

Hereinafter, embodiments of the disclosure will be described with reference to the attached drawings.

Figure 2:
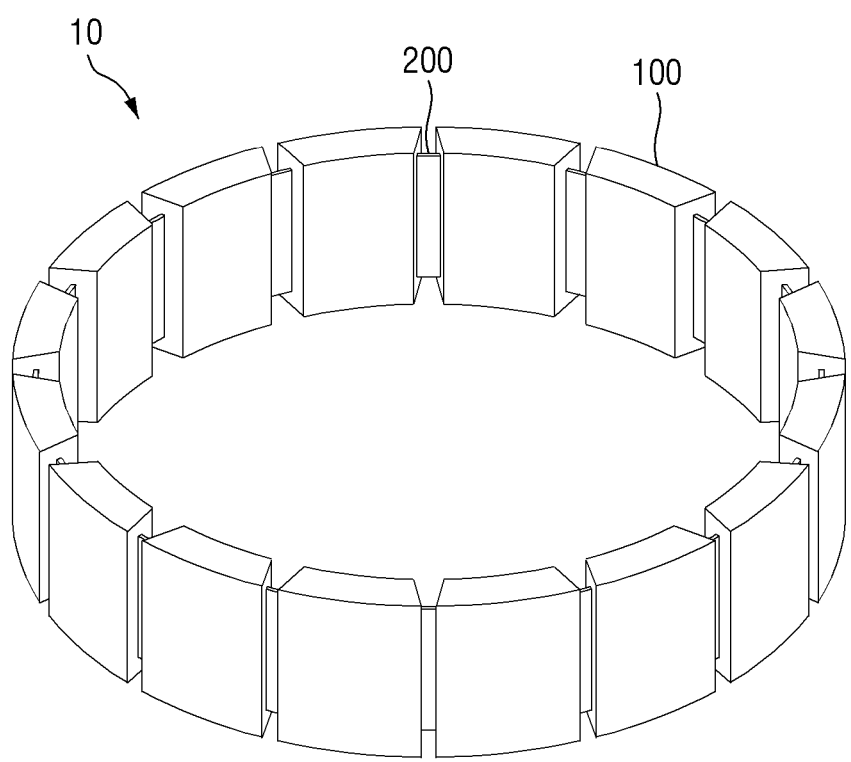
FIG. 2 is a schematic perspective view of the wearable device according to an embodiment of FIG. 1.

FIG. 1 illustrates a state in which a wearable device 10 according to an embodiment is worn. FIG. 2 is a schematic perspective view of the wearable device 10 according to an embodiment of FIG. 1.

In embodiments, a first direction DR1, a second direction DR2, and a third direction DR3 intersect in different directions. The first direction DR1, the second direction DR2, and the third direction DR3 may perpendicularly intersect. For example, the first direction DR1 may be a horizontal direction, the second direction DR2 may be a vertical direction, and the third direction DR3 may be a thickness direction. The first direction DR1, the second direction DR2, and/or the third direction DR3 may include two or more directions. For example, the third direction DR3 may include an upward direction and a downward direction in cross-section. A surface of a member disposed to face in the upward direction may be referred to as an upper member, and the other surface of the member disposed to face in the downward direction may be referred to as a lower member. However, the above directions are examples and relative and are not limited to the above description.

Referring to FIGS. 1 and 2, a user 20 may wear the wearable device 10 such that the wearable device 10 contacts the epidermis of the body. In an embodiment, the wearable device 10 may be worn on the forearm of the user 20 in the form of a band or bracelet.

In FIG. 1, the wearable device 10 is worn in contact with the forearm of the user 20, but the disclosure is not limited thereto. In an embodiment, the wearable device 10 may be worn in contact with other body parts of the user 20. For example, the wearable device 10 may be worn in contact with the wrist, ankle, for example, of the user 20.

The wearable device 10 may obtain information about a motion of the user 20 by sensing a physical change occurring in the epidermis according to the movement of a body part of the user 20 that it contacts and determining the movement of the body part based on the sensed physical change. For example, as illustrated in FIG. 1, in case that the user 20 makes a certain motion by moving his or her hand and arm while wearing the wearable device 10 on the forearm of the user 20, the wearable device 10 may obtain information by sensing a change in the forearm according to the movement of the hand and arm and determining what kind of motion it is based on the sensed change. A control unit or controller such as a microcomputer may transmit information, which is obtained by the wearable device 10 by sensing a change in the forearm according to the hand and arm movement of the user 20 and determining what kind of motion it is based on the sensed change, to an external electronic device through a communication module by mapping an input data value and a stored data value. Therefore, the actual movement of the user 20 may be broadcast through the external electronic device.

Referring to FIG. 2, the wearable device 10 may include sensing blocks 100, and neighboring sensing blocks 100 may be connected to each other by a connection member 200. For example, the sensing blocks 100 may be connected to each other by the connection member 200 and, as a whole, may be in the form of a band or bracelet having a circular shape. It is to be understood that the shapes disclosed herein may have shapes substantial to the shapes disclosed herein.

Each of the sensing blocks 100 may include an upper member, a lower member facing the upper member, and side members located (or disposed) between the upper member and the lower member. The sensing blocks 100 connected by the connection member 200 may be in the form of a band or bracelet. For example, since the sensing blocks 100 are arranged (or disposed) in the form of a band or bracelet having a circular shape, the upper members of the sensing blocks 100 are arranged toward the outside of the band having the circular shape, and the lower members are arranged toward the inside of the band. For example, the upper members of the sensing blocks 100 face the outside of the band, and the lower members of the sensing blocks 100 face the inside of the band. Therefore, the lower members of the sensing blocks 100 adjacent to each other may be arranged side by side each other, and the lower member of a sensing block 100 disposed on one side or a side of the band and the lower member of a sensing block 100 disposed on the other side or another side opposite the above side of the band may face each other. However, the sensing blocks 100 connected by the connection member 200 are not necessarily arranged in the form of a band or bracelet having a circular shape. In an embodiment, the sensing blocks 100 connected by the connection member 200 may also be arranged in the form of a band or bracelet having a polygonal shape.

Accordingly, in case that the wearable device 10 is worn by the user 20 to contact the body of the user 20, the lower members of the sensing blocks 100 included in the wearable device 10 may contact or directly contact the body of the user 20, and the upper members and the side members of the sensing blocks 100 may not directly contact the body of the user 20.

The connection member 200 connecting neighboring sensing blocks 100 may be stretched vertically and horizontally while being worn on the body of the user 20. Therefore, the connection member 200 may include a stretchable material so that it can be closely attached to a body part of the user 20 that it contacts. In an embodiment, the connection member 200 may include a flexible material such as an elastic polymer or rubber. However, the disclosure is not limited thereto.

Figure 3:
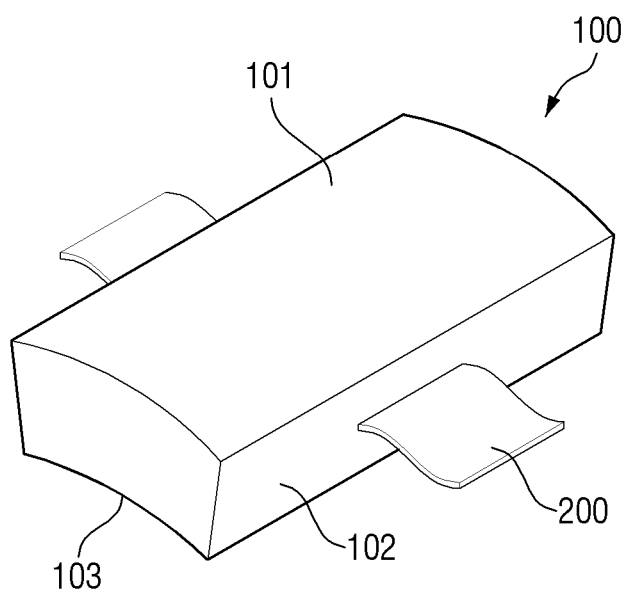
FIG. 3 is a schematic perspective view of a sensing block included in the wearable device according to an embodiment.
Figure 3:
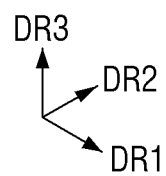
Figure 4:
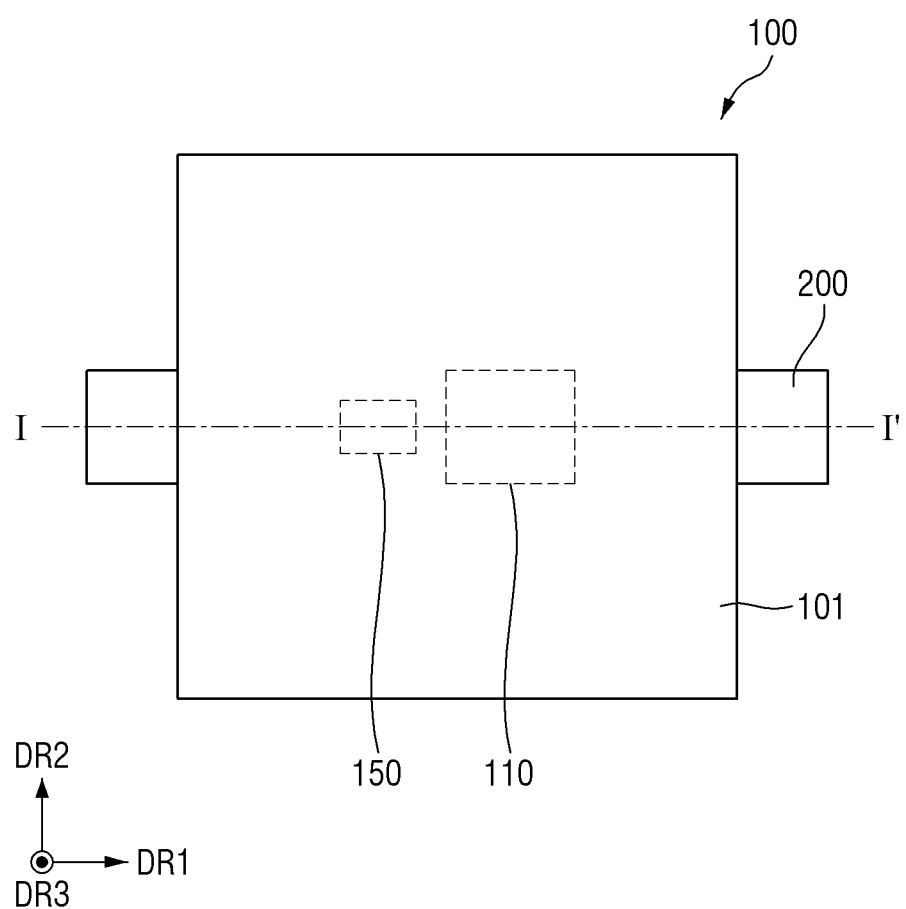
FIG. 4 is a schematic plan view of the sensing block included in the wearable device according to an embodiment.
Figure 5:
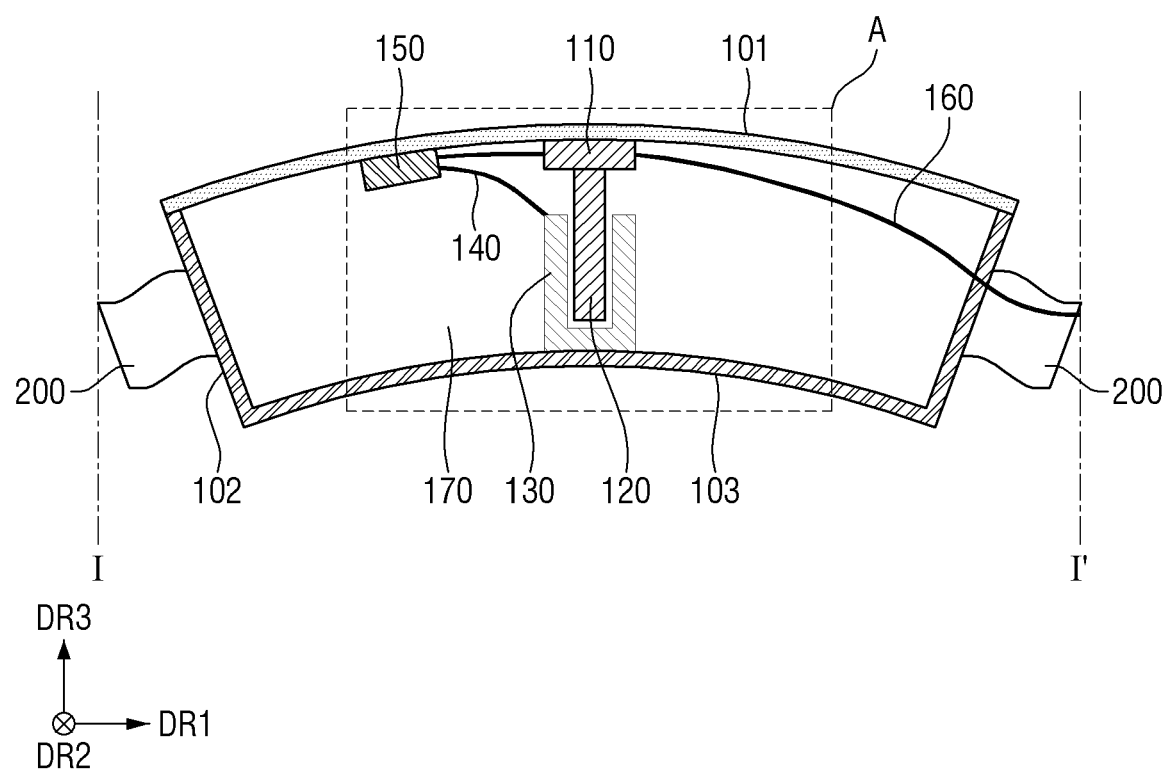
FIG. 5 is a schematic cross-sectional view of the sensing block taken along line I-I' of FIG. 4.
Figure 6:
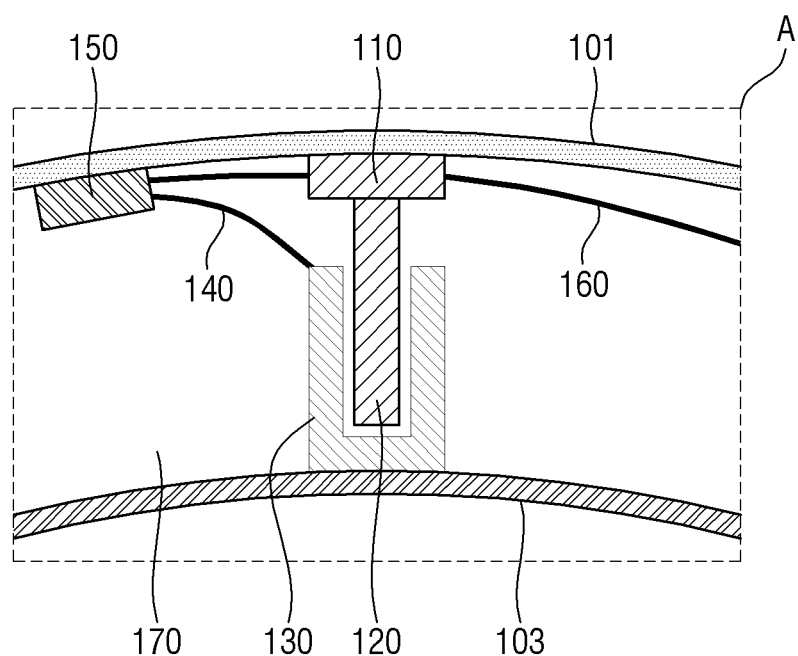
FIG. 6 is an enlarged view of portion A of FIG. 5.

FIG. 3 is a schematic perspective view of a sensing block 100 included in the wearable device 10 according to an embodiment. FIG. 4 is a schematic plan view of the sensing block 100 included in the wearable device 10 according to an embodiment. FIG. 5 is a schematic cross-sectional view of the sensing block 100 taken along line I-I' of FIG. 4. FIG. 6 is an enlarged view of portion A of FIG. 5.

Referring to FIGS. 3 through 5, the sensing block 100 included in the wearable device may include an upper member 101, a lower member 103 facing the upper member 101, and side members 102 located between the upper member 101 and the lower member 103 as described above.

For example, in an embodiment, the upper member 101 and the lower member 103 of the sensing block 100 may include short sides extending along the first direction DR1 and long sides extending along the second direction DR2 intersecting the first direction DR1. The short sides of the upper member 101 and the lower member 103 may include curves, and the long sides of the upper member 101 and the lower member 103 may include straight lines. As illustrated in FIG. 3, in an embodiment, the short sides of the upper member 101 extending along the first direction DR1 may be longer than the short sides of the lower member 103 extending along the first direction DR1. However, the disclosure is not limited thereto. In an embodiment, the short sides of the upper member 101 may have a same length as the short sides of the lower member 103.

Since the short sides of the upper member 101 and the lower member 103 include curves, the upper member 101 and the lower member 103 of the sensing block 100 may have a curved shape. In an embodiment, the curvature of the upper member 101 having a curved shape and the curvature of the lower member 103 having a curved shape may be different. For example, the curvature of the lower member 103 may be greater than the curvature of the upper member 101.

Therefore, the curved shape of the lower member 103 of the sensing block 100 may allow the lower member 103 to be in close contact with a user's body in case that worn in contact with a part of the user's body. However, the disclosure is not limited thereto. In an embodiment, the upper member 101 and the lower member 103 of the sensing block 100 may have a planar shape. In an embodiment, the upper member 101 and the lower member 103 of the sensing block 100 may have different shapes. For example, the upper member 101 of the sensing block 100 may have a planar shape, and the lower member 103 of the sensing block 100 may have a curved shape.

The sensing block 100 may include the side members 102 located between the upper member 101 and the lower member 103. The side members 102 located between the upper member 101 and the lower member 103 may have different areas. For example, the side members 102 located between the short sides of the upper member 101 and the short sides of the lower member 103 may be smaller in area than the side members 102 located between the long sides of the upper member 101 and the long sides of the lower member 103. The side members 102 located between the short sides of the upper member 101 and the short sides of the lower member 103 may include long sides extending in the first direction DR1 and including curves and short sides extending in the third direction DR3 and including straight lines.

In an embodiment, since the short sides of the upper member 101 extending in the first direction DR1 and including curves are longer than the short sides of the lower member 103 extending in the first direction DR1 and including curves, the short sides of the side members 102 located between the short sides of the upper member 101 and the short sides of the lower member 103 may have a reverse taper slope.

The side members 102 located between the long sides of the upper member 101 and the long sides of the lower member 103 may include long sides extending in the second direction DR2 and including straight lines and short sides extending in the third direction DR3 and including straight lines. However, the disclosure is not limited thereto. In an embodiment, the side members 102 located between the upper member 101 and the lower member 103 of the sensing block 100 may be a same in area.

In an embodiment, the upper member 101 of the sensing block 100 may include a rigid material. For example, the upper member 101 of the sensing block 100 may include a hard polymer material such as polyethylene, polypropylene, polyvinyl chloride, polyethylene terephthalate (PET), peroxyacetylnitrate (PAN), polystyrene, polycarbonate, polymethyl methacrylate, polyimide, or cyclic olefin copolymer (COC). However, the disclosure is not limited thereto.

The rigid material of the upper member 101 of the sensing block 100 may protect components included in the sensing block 100 from external impact and prevent deformation of the sensing block 100. In case that the components included in the sensing block 100 are disposed on the upper member 101, the upper member 101 may support the components.

The side members 102 and the lower member 103 of the sensing block 100 may include an elastic material. For example, the side members 102 and the lower member 103 of the sensing block 100 may include an elastomer-based elastic polymer material such as silicone, urethane, or urethane acrylate. However, the disclosure is not limited thereto.

Since the side members 102 and the lower member 103 of the sensing block 100 are made of an elastic material, they may contact a user's body and stretch or contract vertically or horizontally according to the user's body change. The shape of the lower member 103 of the sensing block 100, which contacts or directly contacts the user's body, may be changed vertically or horizontally according to the user's body change. Therefore, a signal generated according to the user's physical change can be sensed by components disposed on the lower member 103.

In an embodiment, the sensing block 100 may include an induced electromotive force sensing module, which may include a magnetic body 110, a rod 120, a coil 130, a connection wire 140, an induced electromotive force sensor 150 and a connection wiring 160, and a filling layer 170.

Referring to FIGS. 4 and 5, the magnetic body 110 may be disposed on a rear surface of the upper member 101 of the sensing block 100. For example, the magnetic body 110 may be fixed to (or attached to) and in direct contact with the rear surface of the upper member 101 of the sensing block 100 and may face the coil 130 disposed on an upper surface of the lower member 103 of the sensing block 100.

In an embodiment, although the magnetic body 110 is disposed in a center of the upper member 101 of the sensing block 100 in FIGS. 4 and 5, the position at which the magnetic body 110 is disposed on the rear surface of the upper member 101 of the sensing block 100 is not particularly limited as long as the magnetic body 110 faces the coil 130 disposed on the upper surface of the lower member 103 of the sensing block 100.

In an embodiment, the magnetic body 110 may be a permanent magnet or an electromagnet that generates a magnetic field. In case that the magnetic body 110 is an electromagnet, the sensing block 100 may further include an additional wire for supplying an electric current to the magnetic body 110 in order to form a magnetic field around the magnetic body 110 by supplying an electric current to the magnetic body 110. However, the type of the magnetic body 110 is not limited to the above examples.

Although the magnetic body 110 disposed on the rear surface of the upper member 101 of the sensing block 100 has a quadrilateral shape in plan view in FIGS. 4 and 5, the planar shape of the magnetic body 110 is not limited thereto. For example, in an embodiment, the magnetic body 110 may have a circular or polygonal shape having an area in plan view.

In an embodiment, the rod 120 may be fixed to (or attached to) and in contact with the magnetic body 110 and may extend along the third direction DR3. For example, the rod 120 may contact the magnetic body 110 disposed on the rear surface of the upper member 101 and extend from the upper member 101 toward the lower member 103, and an end of the rod 120 may not contact the upper surface of the lower member 103. For example, the end of the rod 120 may face the upper surface of the lower member 103 and may be spaced apart from the upper surface of the lower member 103.

Although the magnetic body 110 and the rod 120 contact each other as separate components in FIG. 5, the disclosure is not limited thereto. In an embodiment, the magnetic body 110 and the rod 120 may be integral. For example, the magnetic body 110 and the rod 120 may include a same material or a similar material and may have a T-shape in cross-section.

The rod 120 may be disposed in a center of the coil 130 to be described later and may be surrounded by the coil 130. Therefore, the rod 120 disposed in the center of the coil 130 may restrict the movement path of the coil 130, so that in case that the coil 130 disposed on the upper surface of the lower member 103 moves vertically or horizontally according to a shape change of the lower member 103 including an elastic material, the magnetic body 110 disposed on the rear surface of the upper member 101 can move while facing at least a portion of the coil 130 disposed on the upper surface of the lower member 103. For example, the rod 120 is located in the center of the coil 130 to allow the coil 130 to move within a path so that an induced electromotive force can be generated in the coil 130 according to a change in the magnetic field inside the coil 130 with respect to the relative distance from the magnetic body 110.

In an embodiment, the rod 120 may contact the magnetic body 110 and, like the magnetic body 110, may have magnetism induced by the magnetic field of the magnetic body 110. For example, the rod 120 may be a rigid body such as ferrous metal in which magnetism is induced through contact with the magnetic body 110. However, the rod 120 is not limited thereto, and the material that forms the rod 120 is not particularly limited as long as the rod 120 can have magnetism through contact with the magnetic body 110. For example, the rod 120 may be made of a flexible material as long as the material has magnetism.

The coil 130 may be disposed on the upper surface of the lower member 103 and may extend along the third direction DR3. For example, the coil 130 may be fixed to (or attached to) and in direct contact with the upper surface of the lower member 103 and may surround the rod 120 while extending from the upper surface of the lower member 103 toward the upper member 101. For example, the coil 130 may surround the rod 120 while exposing a portion of the rod 120. Accordingly, the magnetic body 110 and the coil 130 may be spaced apart from each other by a distance along the vertical direction and may face each other. However, the disclosure is not limited thereto. In an embodiment, the coil 130 may extend along the third direction DR3 while surrounding the entire rod 120. In an embodiment, the coil 130 may surround the rod 120 while contacting or directly contacting the rod 120.

In an embodiment, the coil 130 may be made of an electro-conductive material. For example, the coil 130 may be made of a metal through which an electric current can flow. In an embodiment, the coil 130 may be in the form of a transparent film. In an embodiment, the coil 130 may be stacked on the lower member 103. In an embodiment, the material of the coil 130 may be, but is not limited to, nano-silver, graphene, stainless steel, or cellulose viscose fiber.

The induced electromotive force sensor 150 may be disposed on the rear surface of the upper member 101. For example, as illustrated in FIGS. 4 and 5, the induced electromotive force sensor 150 may be spaced apart from the magnetic body 110 along the first direction DR1. For example, the induced electromotive force sensor 150 may be disposed side by side with the magnetic body 110 along the first direction DR1. However, the disclosure is not limited thereto, and the position of the induced electromotive force sensor 150 is not particularly limited. For example, the induced electromotive force sensor 150 may also be spaced apart from and disposed side by side with the magnetic body 110 along the second direction DR2.

The induced electromotive force sensor 150 may be connected to the coil 130 through the connection wire 140. Therefore, an electric current flowing through the coil 130 due to an induced electromotive force generated in the coil 130 may flow to the induced electromotive force sensor 150 along the connection wire 140 connecting the coil 130 and the induced electromotive force sensor 150, and the induced electromotive force sensor 150 may sense the value of the induced electromotive force.

The sensing block 100 may include the filling layer 170 defined by the upper member 101, the side members 102, and the lower member 103. For example, the filling layer 170 may be surrounded by the upper member 101, the side members 102 and the lower member 103 and may be filled with a gaseous fluid. For example, the fluid that fills the filling layer 170 may be air. However, the fluid that fills the filling layer 170 is not limited thereto.

In case that the filling layer 170 is filled with a fluid, it is elastically deformable by the fluid filling the filling layer 170. Accordingly, the filling layer 170 may serve as an impact mitigating layer that protects the components of the sensing block 100 from external impact. Since the filling layer 170 is filled with a fluid, the lower member 103 including an elastic material may expand outward. Therefore, in case that the wearable device 10 is worn in contact with a user's body, the adhesion between the lower member 103 and the user's body may be improved because the lower member 103 of the sensing block 100 contacts the user's body.

The connection wiring 160 may be connected to the induced electromotive force sensor 150 and may extend along the first direction DR1 via the filling layer 170 and a connection member 200 connected to a side member 102. For example, the connection wiring 160 may extend through neighboring blocks 100 included in the wearable device 10 via a connection member 200.

For example, one side or a side of the connection wiring 160 may be connected to the induced electromotive force sensor 150, and the other side or another side of the connection wiring 160 may be connected to the control unit via any one of the sensing blocks 100. For example, the induced electromotive force sensor 150 may transmit an induced electromotive force data value generated by the coil 130 to the control unit through the connection wiring 160. This will be described in detail later with reference to FIG. 15.

Hereinafter, other embodiments will be described. In the following embodiments, a description of the same components as those of the previously described embodiment will be omitted or given briefly, and differences will be described.

Figure 7:
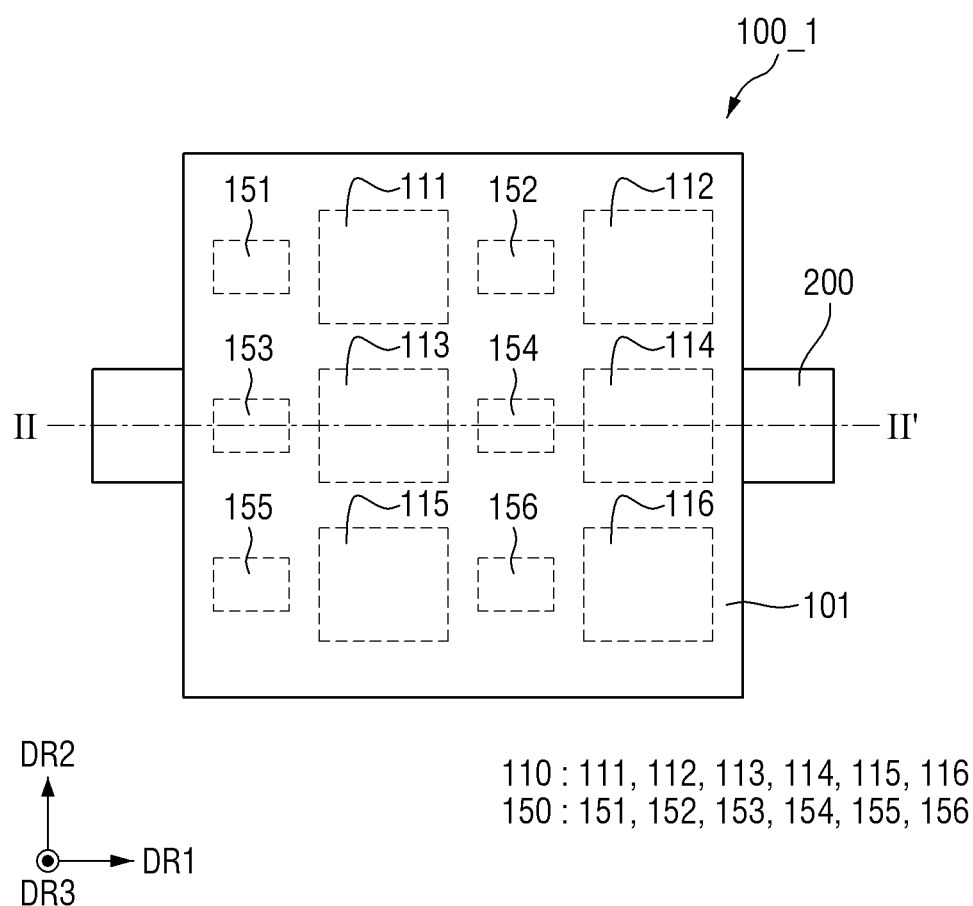
FIG. 7 is a schematic plan view of a sensing block included in a wearable device according to an embodiment.
Figure 8:
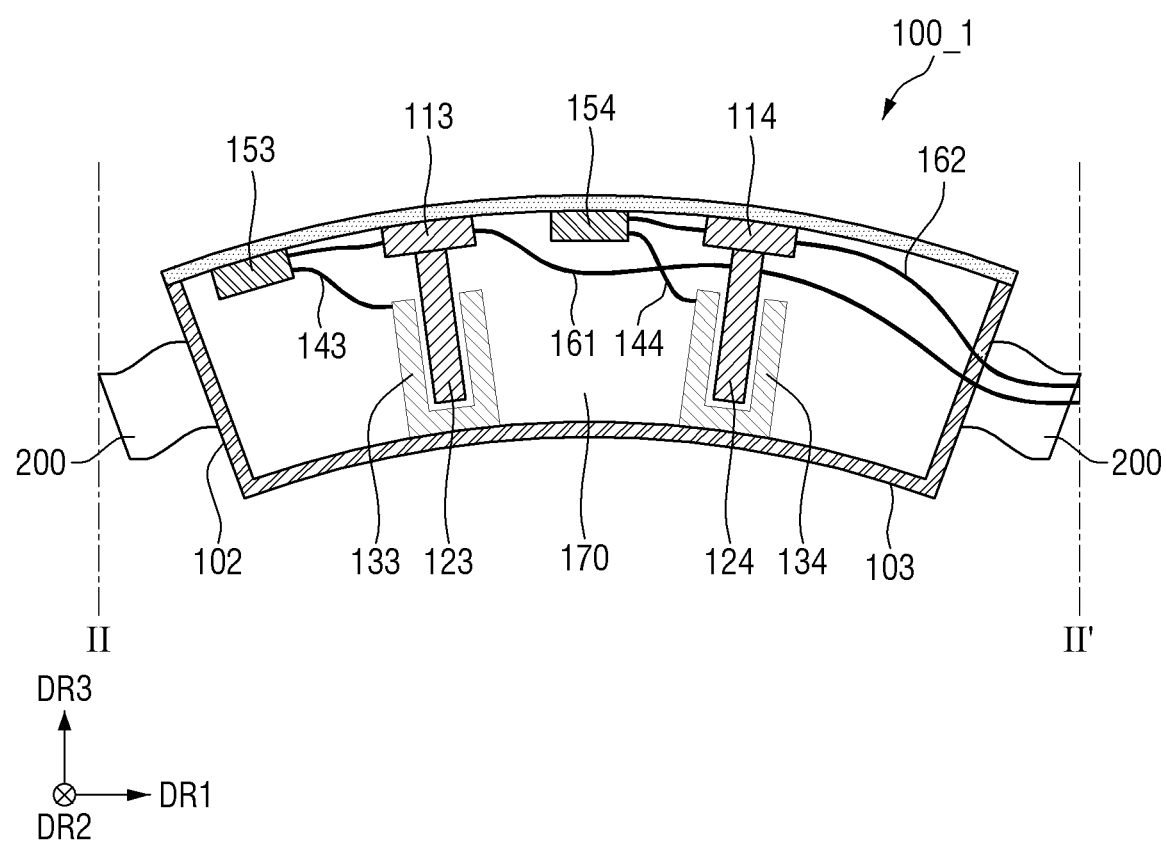
FIG. 8 is a schematic cross-sectional view of the sensing block taken along line II-II' of FIG. 7.

FIG. 7 is a schematic plan view of a sensing block 100_1 included in a wearable device according to an embodiment. FIG. 8 is a schematic cross-sectional view of the sensing block 100_1 taken along line II-II' of FIG. 7.

An embodiment illustrated in FIGS. 7 and 8 may be different from an embodiment illustrated in FIGS. 4 and 5 in that it may include magnetic bodies 110, rods 123 and 124, coils 133 and 134, electric wires 143 and 144, induced electromotive force sensors 150, and connection wirings 161 and 162. For example, an embodiment illustrated in FIGS. 7 and 8 may be different from an embodiment illustrated in FIGS. 4 and 5 in that it may include of induced electromotive force sensing modules.

For example, the magnetic bodies 110 may include a first magnetic body 111, a second magnetic body 112, a third magnetic body 113, a fourth magnetic body 114, a fifth magnetic body 115, and a sixth magnetic body 116. The induced electromotive force sensors 150 may include a first induced electromotive force sensor 151, a second induced electromotive force sensor 152, a third induced electromotive force sensor 153, a fourth induced electromotive force sensor 154, a fifth induced electromotive force sensor 155, and a sixth induced electromotive force sensor 156.

Referring to FIG. 7, the magnetic bodies 110 and the induced electromotive force sensors 150 may be disposed on a rear surface of an upper member 101 of the sensing block 100_1 as in an embodiment illustrated in FIG. 4. The magnetic bodies 110 and the induced electromotive force sensors 150 may be spaced apart from each other along the first direction DR1 and the second direction DR2 and arranged in a matrix in plan view. For example, the magnetic bodies 110 and the induced electromotive force sensors 150 may be alternately arranged along the first direction DR1 to form rows and may be arranged at intervals along the second direction DR2 to form columns. For example, the first induced electromotive force sensor 151, the first magnetic body 111, the second induced electromotive force sensor 152, and the second magnetic body 112 may be alternately arranged along the first direction DR1 to form a first row, and the first induced electromotive force sensor 151, the third induced electromotive force sensor 153, and the fifth induced electromotive force sensor 155 may be arranged at intervals along the second direction DR2 to form a first column.

In FIG. 8, components and cross-sectional structures of induced electromotive force sensing modules including the third magnetic body 113 and the fourth magnetic body 114 are described. However, since the components and cross-sectional structures around the third magnetic body 113 and the fourth magnetic body 114 are substantially the same as components and cross-sectional structures of induced electromotive force sensing modules including the first magnetic body 111, the second magnetic body 112, the fifth magnetic body 115 and the sixth magnetic body 116, the description of the components and cross-sectional structures of the induced electromotive force sensing modules including the third magnetic body 113 and the fourth magnetic body 114 may be equally applied to the components and cross-sectional structures of the induced electromotive force sensing modules including the first magnetic body 111, the second magnetic body 112, the fifth magnetic body 115 and the sixth magnetic body 116.

Referring to FIG. 8, unlike in an embodiment according to FIG. 5, induced electromotive force sensing modules including a third induced electromotive force sensing module, which may include the third magnetic body 113, a third rod 123, a third coil 133, a third connection wire 143 and the third induced electromotive force sensor 153, and a fourth induced electromotive force sensing module, which may include the fourth magnetic body 114, a fourth rod 124, a fourth coil 134, a fourth connection wire 144 and the fourth induced electromotive force sensor 154, may be provided.

For example, an induced electromotive force generated in the third coil 133 by the third magnetic body 113 and the third coil 133 may be connected to the third induced electromotive force sensor 153 through the third connection wire 143, and an induced electromotive force generated in the fourth coil 134 by the fourth magnetic body 114 and the fourth coil 134 may be connected to the fourth induced electromotive force sensor 154 through the fourth connection wire 144.

The third induced electromotive force sensor 153 may be connected to a first connection wiring 161, the fourth induced electromotive force sensor 154 may be connected to a second connection wiring 162, and the first connection wiring 161 and the second connection wiring 162 may be connected to a control unit included in anyone sensing block 100_1 of the wearable device 10 via a filling layer 170 and sensing blocks 100_1 neighboring each other.

For example, the third induced electromotive force sensor 153 senses the induced electromotive force generated in the third coil 133 and is connected to the control unit through the first connection wiring 161, and the fourth induced electromotive force sensor 154 senses the induced electromotive force generated in the fourth coil 134 and is connected to the control unit through the second connection wiring 162. Therefore, data values transmitted from the third induced electromotive force sensor 153 and the fourth induced electromotive force sensor 154 to the control unit may be different from each other. In other words, values of induced electromotive forces generated in the third coil 133 and the fourth coil 134 respectively connected to the third induced electromotive force sensor 153 and the fourth induced electromotive force sensor 154 may be different from each other, and the third induced electromotive force sensor 153 and the fourth induced electromotive force sensor 154 may independently sense induced electromotive forces and transmit sensed data values to the control unit through different paths through the first connection wiring 161 and the second connection wiring 162. Hence, the data values do not affect each other.

Therefore, in case that the wearable device 10 including induced electromotive force sensing modules is worn in contact with a user's body, the user's movement can be more precisely sensed by sensors included in the induced electromotive force sensing modules.

FIGS. 9 through 12 are schematic diagrams illustrating physical changes of a forearm and a wearable device 10 according to a user's hand or arm motion.

Figure 9:
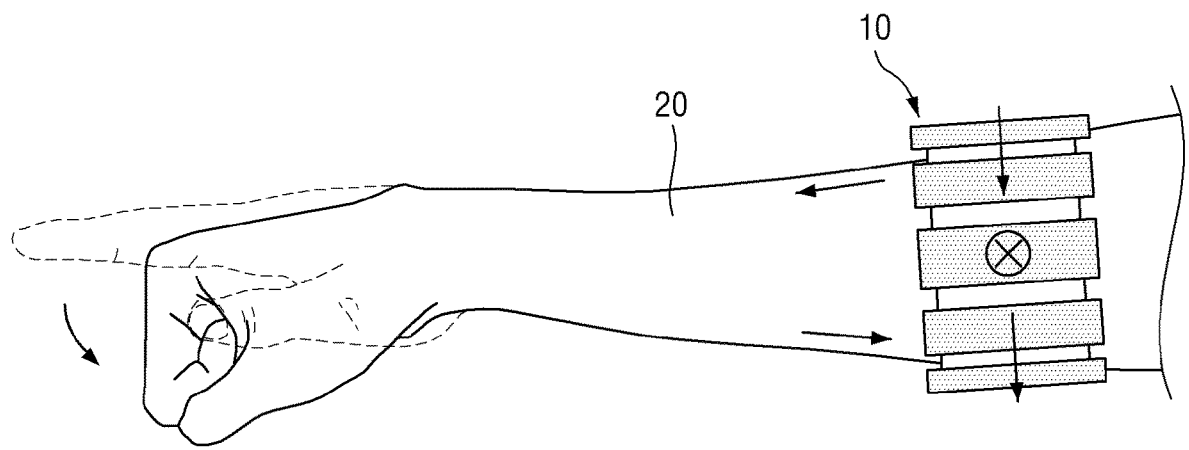
FIGS. 9 through 12 are schematic diagrams illustrating physical changes of a forearm and a wearable device according to a user's hand or arm motion.

Referring to FIG. 9, in case that a user 20 clenches his or her fist, the epidermis in upper and lower parts of the forearm of the user 20 in contact with the wearable device 10 may be relaxed or contracted by the contraction of muscles. For example, the epidermis in the upper part of the forearm may be extended in a longitudinal direction of the forearm by the relaxation of the muscles, and the wearable device 10 in contact with the epidermis in the upper part of the forearm may be contracted vertically toward the epidermis in the upper part of the forearm of the user 20. The epidermis in the lower part of the forearm may be contracted in the longitudinal direction of the forearm by the contraction of the muscles, and the wearable device 10 in contact with the epidermis in the lower part of the forearm may be expanded vertically toward the opposite direction of the epidermis in the lower part of the forearm. The epidermis in a middle part of the forearm of the user 20 may be extended in the longitudinal direction of the forearm by the relaxation of the muscles of the forearm, and the wearable device 10 in contact with the epidermis in the middle part of the forearm of the user 20 may be contracted vertically toward the epidermis in the middle part of the forearm of the user 20.

Figure 10:
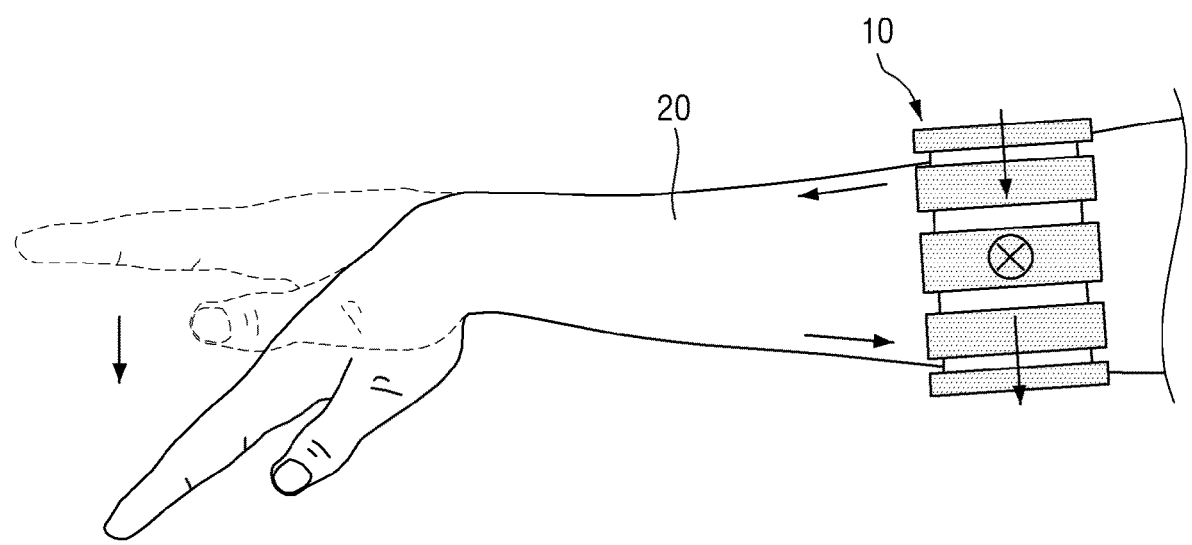
Figure 11:
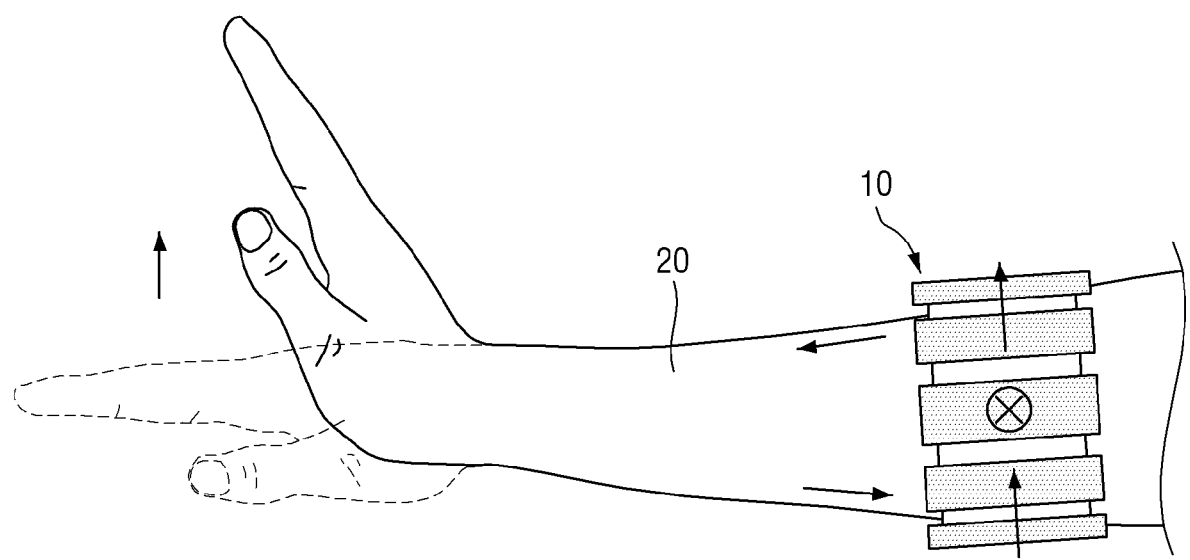

Referring to FIGS. 10 and 11, in case that the user 20 bends his or her hand down or up, the epidermis in the upper and lower parts of the forearm of the user 20 in contact with the wearable device 10 may be extended or contracted in the longitudinal direction of the forearm by the relaxation or contraction of the muscles. For example, the wearable device 10 in contact with the upper or lower part of the forearm of the user 20 may be contracted vertically toward the epidermis in the upper or lower part of the forearm of the user 20 or may be expanded vertically toward the opposite direction of the epidermis in the upper part or the lower part of the forearm of the user 20. The epidermis in the middle part of the forearm of the user 20 may be extended in the longitudinal direction of the forearm by the relaxation of the muscles of the forearm, and the wearable device 10 in contact with the epidermis in the middle part of the forearm may be contracted vertically toward the epidermis in the middle part of the forearm of the user 20.

Figure 12:
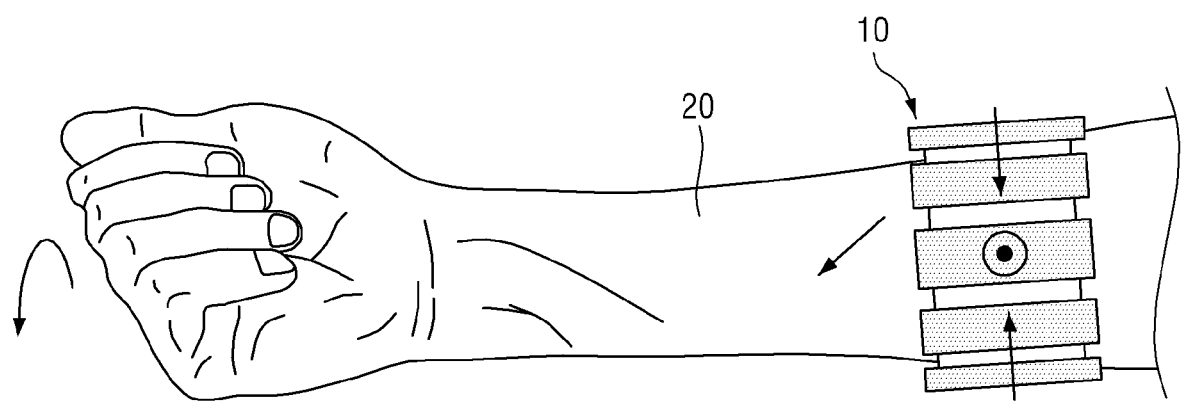

Referring to FIG. 12, in case that the user 20 rotates his or her hand or arm, the epidermis in the upper, middle, and lower parts of the forearm of the user 20 in contact with the wearable device 10 may be extended or contracted in a direction oblique to the longitudinal direction of the forearm by the relaxation or contraction of the muscles. For example, as the epidermis in the upper and lower parts of the forearm of the user 20 is extended in a direction oblique to the longitudinal direction of the forearm by the relaxation of the muscles, the wearable device 10 in contact with the upper and lower parts of the forearm may be contracted vertically toward the epidermis in the upper and lower parts of the forearm. As the epidermis in the middle part of the forearm of the user 20 is contracted in a direction oblique to the longitudinal direction of the forearm by the contraction of the muscles, the wearable device 10 may be expanded vertically toward the opposite direction of the epidermis in the middle part of the forearm.

The hand or arm motions illustrated in FIGS. 9 through 12 are only examples, and the wearable device 10 according to an embodiment may recognize various motions as well as the hand or arm motions illustrated in FIGS. 9 through 12.

As described above, the adhesion between the forearm and the wearable device 10 may be increased or decreased by the movement of the forearm according to a hand or arm motion of the user 20. The wearable device 10 may contact the forearm of the user 20 and sense a physical change in the vertical direction due to the contraction or relaxation of the muscles of the forearm according to a hand or arm motion.

Figure 13:
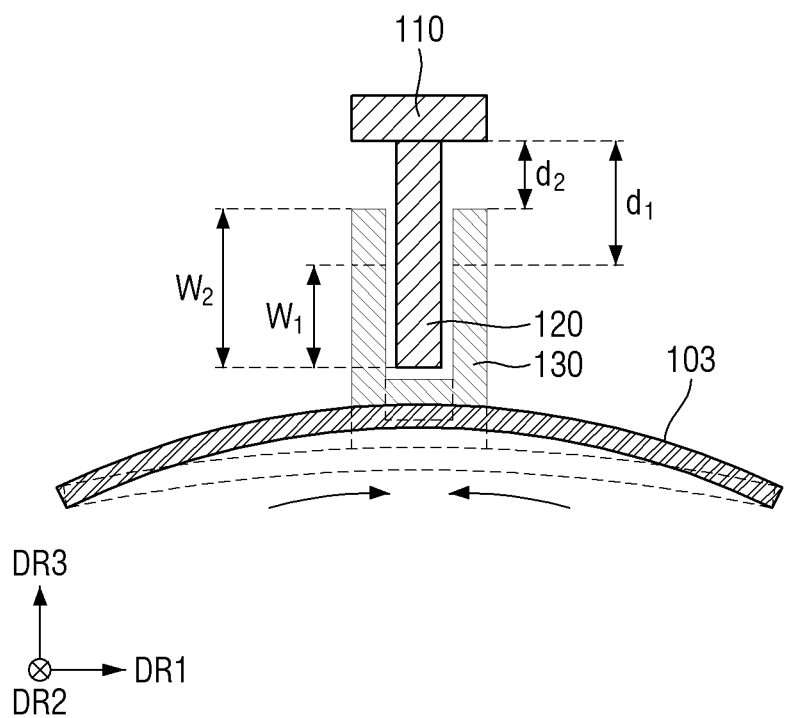
FIGS. 13 and 14 are schematic diagrams for explaining the operation of a wearable device according to an embodiment for sensing physical changes according to a user's motion.
Figure 14:
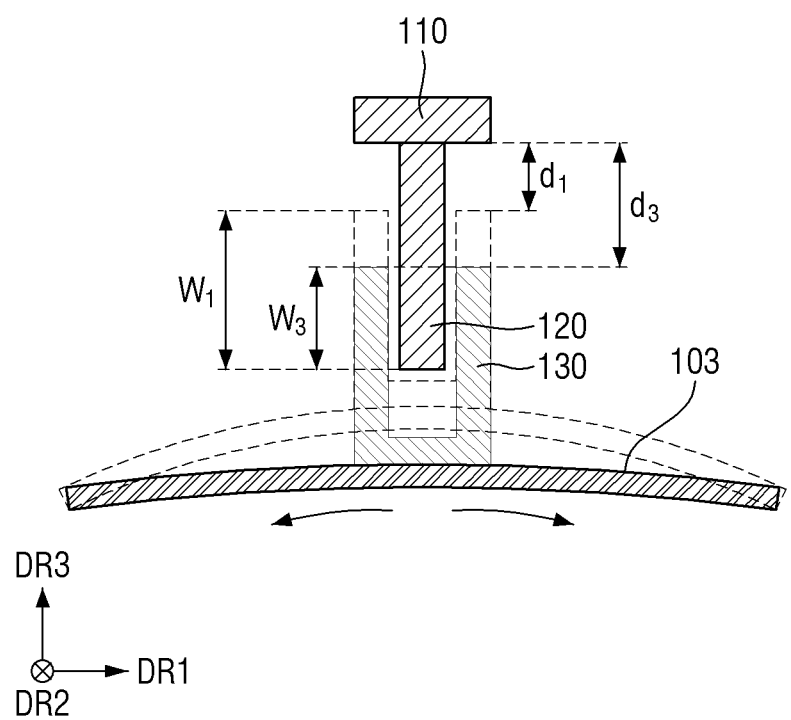

FIGS. 13 and 14 are schematic diagrams for explaining the operation of a wearable device according to an embodiment for sensing physical changes according to a user's motion.

In FIGS. 13 and 14, the operation of a lower member 103 and a coil 130 disposed on the lower member 103 is described, and a change in relative distance from a magnetic body 110 according to the operation of the lower member 103 and the coil 130 disposed on the lower member 103 is described. To this end, other components included in a sensing block 100 (see FIG. 5) are omitted.

Referring to FIG. 13, in case that the lower member 103 having an elastic force contacts a user's body, it may contract according to a physical change of the user's body. For example, as described above with reference to FIGS. 9 through 12, in case that a lower surface of the lower member 103 contacts the user's forearm, if muscles of the forearm contract to expand outwards, the lower surface of the lower member 103 in direct contact with the forearm may also contract.

For example, in case that the lower surface of the lower member 103 contracts, the curvature of the lower member 103 may become greater than before the lower member 103 contracts. Accordingly, the coil 130 disposed on an upper surface of the lower member 103 may move in the third direction DR3. For example, the coil 130 disposed on the upper surface of the lower member 103 may move toward the magnetic body 110 due to the contraction of the lower member 103.

As the coil 130 disposed on the upper surface of the lower member 103 moves upward due to the contraction of the lower member 103 as described above, a vertical distance d2 between the magnetic body 110 and the coil 130 after the contraction of the lower member 103 may be smaller than a vertical distance d1 between the magnetic body 110 and the coil 130 before the contraction of the lower member 103. Therefore, a magnetic field or magnetic flux inside the coil 130 may change according to a change in the vertical distance between the magnetic body 110 and the coil 130, thereby generating an induced electromotive force in the coil 130.

In case that a rod 120 has magnetism like the magnetic body 110 as described above, an induced electromotive force may be generated not only according to a change in the distance between the coil 130 and the magnetic body 110 but also according to a change in the magnetic field or magnetic flux inside the coil 130 that occurs in case that the area of the coil 130 overlapping the rod 120 changes as the coil 130 moves upward. For example, the area W2 of the coil 130 overlapping the rod 120 after the contraction of the lower member 103 may be larger than the area W1 of the coil 130 overlapping the rod 120 before the contraction of the lower member 103. Therefore, an induced electromotive force may be generated in the coil 130 as the magnetic field or magnetic flux inside the coil 130 changes according to a change in the area of the coil 130 overlapping the rod 120.

Referring to FIG. 14, unlike in the case of FIG. 13, in case that the epidermis of the user's forearm is extended along the longitudinal direction of the forearm due to the relaxation of the muscles of the forearm, the lower surface of the lower member 103 in direct contact with the user's forearm may also relax.

For example, in case that the lower surface of the lower member 103 is relaxed, the curvature of the lower member 103 may become smaller than before the relaxation of the lower member 103. Accordingly, the coil 130 disposed on the upper surface of the lower member 103 may move along the third direction DR3. For example, the coil 130 disposed on the upper surface of the lower member 103 may move away from the magnetic body 110 due to the relaxation of the lower member 103.

As the coil 130 disposed on the upper surface of the lower member 103 moves downward due to the relaxation of the lower member 103, a vertical distance d3 between the magnetic body 110 and the coil 130 after the relaxation of the lower member 103 may be greater than a vertical distance d1 between the magnetic body 110 and the coil 130 before the relaxation of the lower member 103. Therefore, as in the case of FIG. 13, an induced electromotive force may be generated in the coil 130 according to a change in the vertical distance between the magnetic body 110 and the coil 130.

In case that the rod 120 has magnetism like the magnetic body 110, an induced electromotive force may be generated not only according to a change in the vertical distance between the coil 130 and the magnetic body 110 but also according to a change in the magnetic field or magnetic flux inside the coil 130 that occurs in case that the area of the coil 130 overlapping the rod 120 changes as the coil 130 moves downward. For example, the area W3 of the coil 130 overlapping the rod 120 after the relaxation of the lower member 103 may be smaller than the area W1 of the coil 130 overlapping the rod 120 before the relaxation of the lower member 103. Therefore, an induced electromotive force may be generated in the coil 130 as the magnetic field or magnetic flux inside the coil 130 changes according to a change in the area of the coil 130 overlapping the rod 120.

Therefore, as described above, it is possible to recognize a change in a user's body part by measuring a value of an induced electromotive force generated in the coil 130 by a change in the relative distance from the magnetic body 110 and a change in the area of the coil 130 overlapping the magnetic body 110 according to the operation of the lower member 103 in direct contact with the user's body part and the coil 130 disposed on the upper surface of the lower member 103.

Figure 15:
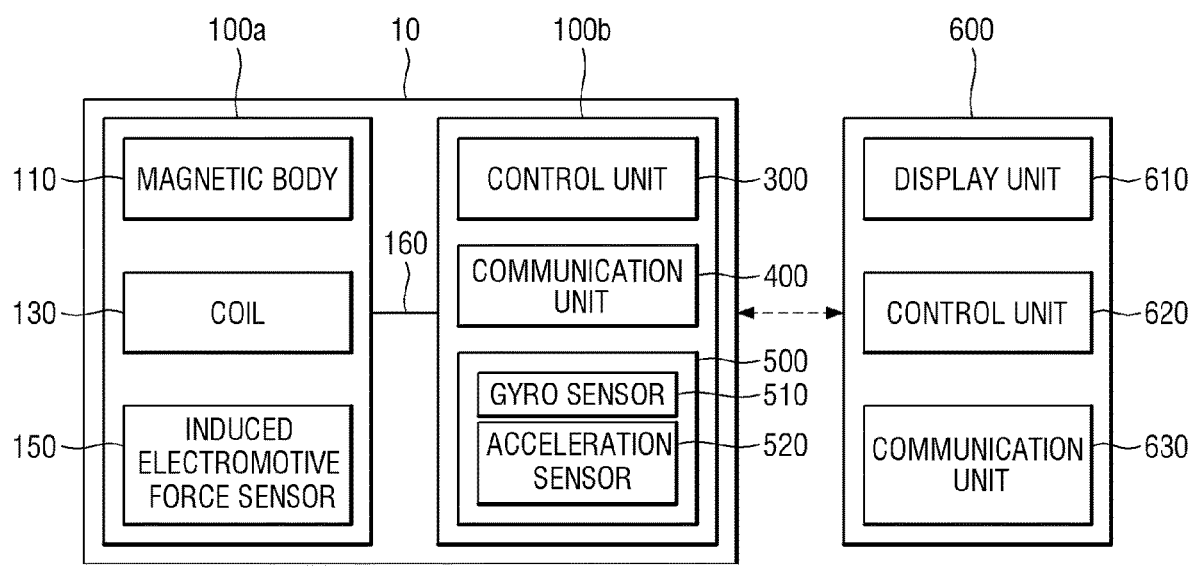
FIG. 15 is a block diagram of a wearable device and an external electronic device according to an embodiment.

FIG. 15 is a block diagram of a wearable device 10 and an external electronic device 600 according to an embodiment.

Referring to FIG. 15, as described above, the wearable device 10 may include sensing blocks including a first sensing block 100a and a second sensing block 100b.

Among the sensing blocks included in the wearable device 10, the first sensing block 100a may include a magnetic body 110, a coil 130, and an induced electromotive force sensor 150. Among the sensing blocks, the second sensing block 100b may include a control unit 300, a communication unit 400, and inertial sensors 500.

Since the magnetic body 110, the coil 130, and the induced electromotive force sensor 150 are substantially the same as those described above, a description thereof will be omitted. In FIG. 15, the control unit 300, the communication unit 400 and the inertial sensors 500 included in the second sensing block 100b and the operation of the wearable device 10 including the first sensing block 100a and the second sensing block 100b will be described in detail.

The inertial sensors 500 included in the second sensing block 100b may include one or more sensors. As illustrated in FIG. 15, the inertial sensors 500 may include at least any one of a gyro sensor 510 and an acceleration sensor 520. Therefore, the wearable device 10 may sense a user's state of motion, such as movement or rotation, using the inertial sensors 500. For example, in case that the second sensing block 100b is worn in contact with the epidermis of a user's forearm, values of factors related to inertia such as acceleration or gravity that is changed by the user's hand or arm motions described above with reference to FIGS. 9 through 12 may be sensed through the inertial sensors 500. However, the disclosure is not limited thereto. In an embodiment, the inertial sensors 500 may further include a tilt sensor, a motion sensor, and the like within the spirit and the scope of the disclosure.

As a magnetic field inside the coil 130 is changed by a change in the distance between the magnetic body 110 and the coil 130 included in the first sensing block 100a, an induced electromotive force may be generated in the coil 130, and the induced electromotive force generated in the coil 130 may be sensed by the induced electromotive force sensor 150. For example, in case that the first sensing block 100a is worn in contact with the epidermis of a user's forearm, an induced electromotive force value that is changed by the user's hand or arm motions described above with reference to FIGS. 9 through 12 may be sensed through the induced electromotive force sensor 150.

A data value of an induced electromotive force sensed by the induced electromotive force sensor 150 included in the first sensing block 100a and data values of factors related to inertia sensed by the inertial sensors 500 included in the second sensing block 100b may be transmitted to the control unit 300 included in the second sensing block 100b.

For example, the induced electromotive force sensor 150 included in the first sensing block 100a may be connected to the control unit 300 included in the second sensing block 100b through a connection wiring 160 as described above, and the control unit 300 may receive a data value sensed by the induced electromotive force sensor 150 through the connection wiring 160.

In an embodiment, in case that the first sensing block 100a may include induced electromotive force sensors 150 as in an embodiment illustrated in FIGS. 7 and 8, the induced electromotive force sensors 150 may individually sense values of induced electromotive forces generated in coils 130 and individually transmit data values to the control unit 300 through different connection wirings 160 as described above. The data values of the induced electromotive forces respectively sensed by the induced electromotive force sensors 150 may be different and may be independently transmitted to the control unit 300 without affecting each other.

Like the induced electromotive force sensor 150, the inertial sensors 500 included in the second sensing block 100b may receive data values through wirings. However, the disclosure is not limited thereto, and the method in which the control unit 300 receives data values sensed by the induced electromotive force sensor 150 and the inertial sensors 500 is not particularly limited.

In an embodiment, the control unit 300 may collect an induced electromotive force data value and inertial data values respectively received from the induced electromotive force sensor 150 and the inertial sensors 500 and map the received data values to a mapping table stored in the control unit 300. Through this process, the control unit 300 may output a data value corresponding to a user's motion.

As in the case of receiving an induced electromotive force data value from each of induced electromotive force sensors 150, the control unit 300 may individually receive data values from the induced electromotive force sensor 150 and the inertial sensors 500, respectively. A data value transmitted from the inductive electromotive force sensor 150 and data values transmitted from the inertial sensors 500 may not affect each other and may be independent of each other.

The communication unit 400 included in the second sensing block 100b may form a communication channel of a set method with a supported network under the control of the control unit 300 to transmit and receive signals related to wireless communication, such as voice communication and video communication, and data communication based on a message service such as a short message service (SMS), a multimedia messaging service (MMS), and the Internet.

The communication unit 400 may include a transceiver that up-converts and amplifies a frequency of a transmitted signal and low-noise amplifies and down-converts a frequency of a received signal. Communication channels of the communication unit 400 may include a mobile communication channel such as code division multiple access (CDMA), time division multiple access (TDMA) or orthogonal frequency-division multiple access (OFDMA) and an Internet communication channel such as a wired Internet network or a wireless Internet network. However, the disclosure is not limited thereto.

In an embodiment, the communication unit 400 may include a near-field communication module. The communication unit 400 may map received data values to a mapping table stored in the control unit 300 and transmit a data value corresponding to a user's motion to the external electronic device 600 through the near-field communication module (for example, Bluetooth or Wi-Fi direct) under the control of the control unit 300.

In an embodiment, the external electronic device 600 may include a display unit 610, a control unit 620, and a communication unit 630. The communication unit 630 of the external electronic device 600 may receive a data value corresponding to a user's motion from the communication unit 400 of the wearable device 10 under the control of the control unit 620 of the external electronic device 600. The communication unit 630 of the external electronic device 600 may be substantially the same as the communication unit 400 of the wearable device 10. However, the disclosure is not limited thereto, and the communication unit 630 is not particularly limited as long as it can transmit and receive data to and from the communication unit 400 of the wearable device 10.

The display unit 610 may display a data value received from the wearable device 10 through the communication unit 630 on a screen under the control of the control unit 620. For example, in case that the control unit 620 processes (for example, decodes) data and stores the processed data in a buffer, the display unit 610 may convert the data stored in the buffer into an analog signal and display the analog signal on the screen.

Examples of the display unit 610 may include an organic light emitting display device, a liquid crystal display device, a plasma display device, a field emission display device, an electrophoretic display device, an electrowetting display device, a quantum dot light emitting display device, and a micro-light emitting diode (LED) display device. However, the display unit 610 is not limited to the above examples.

FIG. 16 illustrates an example of a mapping table according to an embodiment.

Referring to FIG. 16, the control unit 300 of the wearable device 10 described above with reference to FIG. 15 may include a table for measuring a user's motion. In an embodiment, the table for measuring a user's motion may store the user's motion, which is mapped according to data values sensed by sensors, in the form of a table. For example, the user's motion may include the intensity (or size or strength) of the user's hand or arm motion, the number of hand motions, the rotation of a hand motion, hand or arm movement, etc., within the spirit and the scope of the disclosure.

For example, in case that the wearable device 10 may include five sensors or n sensors, sensor n, if sensor1 through sensors respectively sense data values of Data[0,0], Data[0, 1], for example, Data[0,2], for example, Data[0,3] and for example, Data[0,4], the control unit 300 of the wearable device 10 may combine the data values sensed by sensor1 through sensors and compare them with the mapping table. If the combined data values are a combination of data values corresponding to Motion1, for example, the control unit 300 may output a data value corresponding to Motion1. It is to be understood that the mapping table of FIG. 16 is an example and may include other Data and other sensors as well as Motion n.

In an embodiment, a sensor may be the induced electromotive force sensor 150 (see FIG. 15), a motion may be a user's hand or arm motion, and data may be a value of an induced electromotive force generated in the coil 130 (see FIG. 15). However, the disclosure is not limited thereto.

Figure 17:
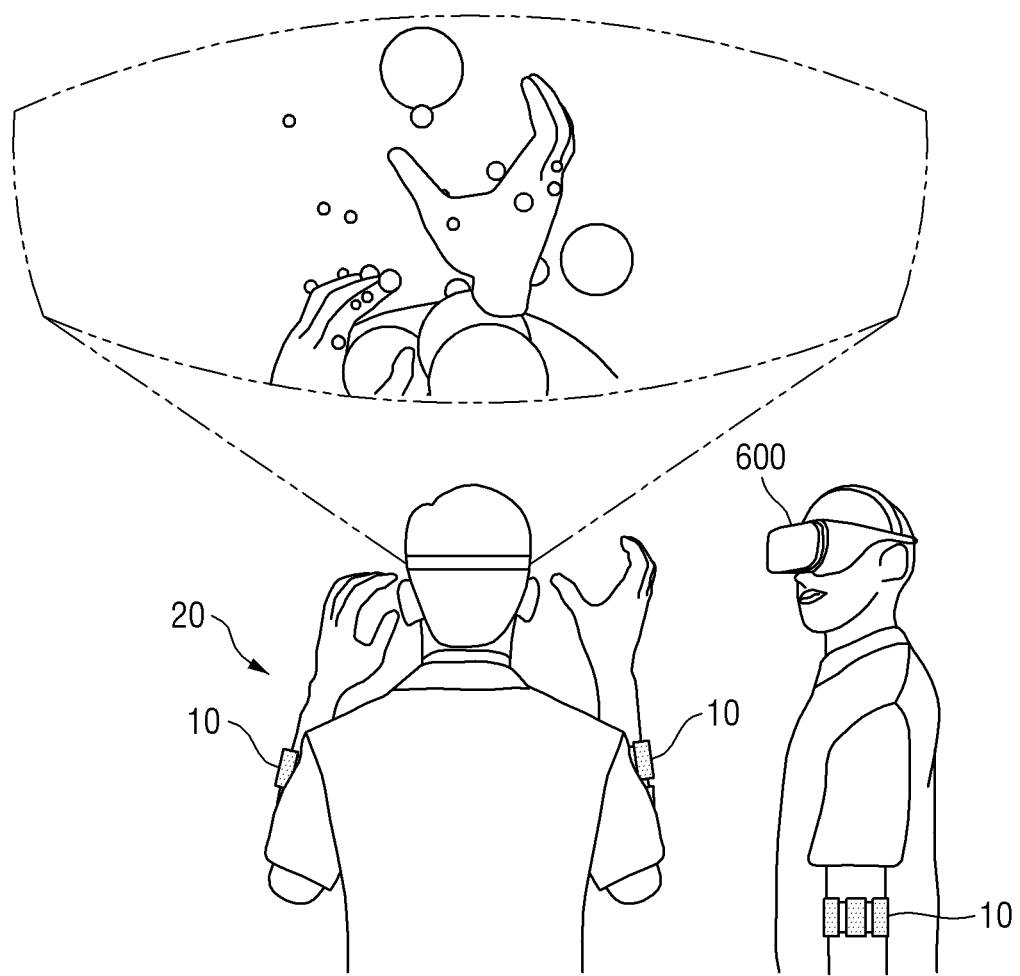
FIGS. 17 and 18 illustrate embodiments in which a user's motion is displayed on external electronic devices connected to a wearable device according to an embodiment.
Figure 18:
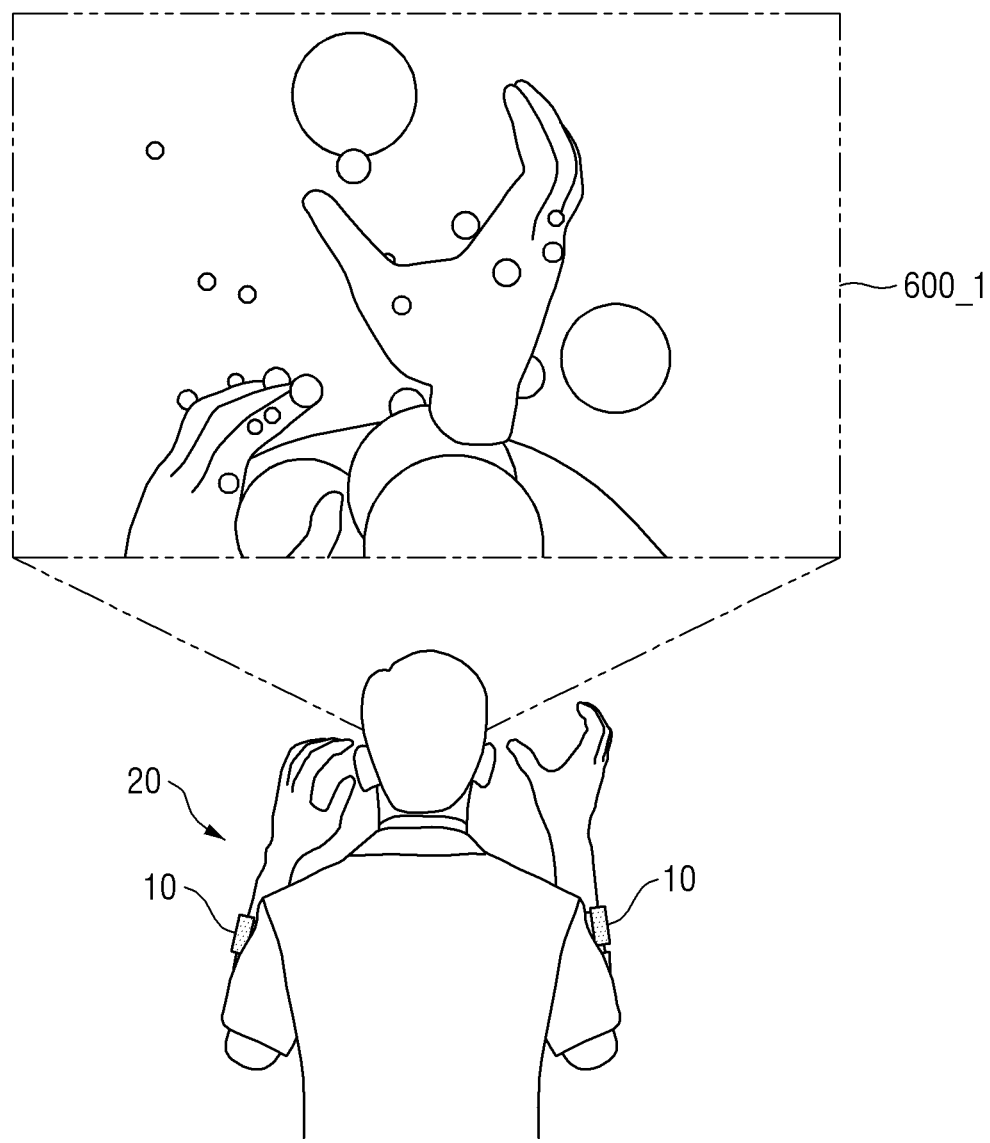

FIGS. 17 and 18 illustrate embodiments in which a user's motion is displayed on external electronic devices connected to a wearable device 10 according to an embodiment.

An embodiment illustrated in FIG. 17 is an embodiment in which an external electronic device 600 connected to the wearable device 10 is a head-mounted device (HMD) or a helmet.

In an embodiment of FIG. 17, as described above, in case that a user 20 wears the wearable device 10 on his or her forearm and makes a certain motion by moving a hand or arm, the wearable device 10 may sense the contraction or relaxation of the epidermis of the forearm according to the hand or arm movement of the user 20. Through the operation process described above with reference to FIG. 15, the motion according to the actual hand or arm movement of the user 20 may be reflected in virtual reality through a display unit of an HMD or helmet which is the external electronic device 600 worn by the user 20.

An embodiment according to FIG. 18 may be different from an embodiment according to FIG. 17 in that the user 20 does not wear the external electronic device 600 such as an HMD or a helmet and that the motion according to the actual hand or arm movement of the user 20 is reflected in virtual reality through an external electronic device 600_1 such as a television.

In FIGS. 17 and 18, each of the external electronic devices 600 and 600_1 is illustrated as a display device such as an HMD, a helmet, or a television. However, the external electronic devices 600 and 600_1 are not particularly limited as long as they can transmit and receive data to and from the wearable device 10 through a communication unit. For example, each of the external electronic devices 600 and 600_1 may be a device that displays a moving image or a still image, and examples of the external electronic devices 600 and 600_1 may include portable electronic devices such as mobile phones, smartphones, tablet personal computers (PCs), smart watches, watch phones and mobile communication terminals as well as various products such as televisions, laptop computers, monitors, billboards and the Internet of things. In an embodiment, each of the external electronic devices 600 and 600_1 may be a console game machine including a communication module for wired/wireless communication.

As described above, the wearable device 10 according to an embodiment senses an induced electromotive force data value, which changes according to the movement of a user's forearm according to the user's hand and arm motion, through an induced electromotive force sensing module included in each of blocks in contact with the user's forearm and reflects the user's hand and arm movement in an external electronic device by mapping the induced electromotive force data value. Therefore, it is possible to reflect detailed movements from the hand to the wrist in the external electronic device. Since the wearable device 10 is worn on the forearm, the movement of the hand may be natural, thus enabling more detailed work.

In concluding the detailed description, those skilled in the art will appreciate that many variations and modifications can be made to the embodiments without substantially departing from the principles of the disclosure. Therefore, the disclosed embodiments are used in a generic and descriptive sense only and not for purposes of limitation.

What is claimed is:

1. A wearable device comprising:
sensing blocks; and
a connection member connecting the sensing blocks, wherein
the sensing blocks comprise:
   a first sensing block; and
   a second sensing block connected to the first sensing block by the connection member, and
the first sensing block comprises an induced electromotive force sensing module,
the induced electromotive force sensing module comprises:
   a magnetic body;
   a coil not contacting the magnetic body and facing the magnetic body;
   a rod attached to the magnetic body and guiding a movement path of the coil, and
   an induced electromotive force sensor sensing an induced electromotive force generated in the coil by the coil and the magnetic body.

2. The wearable device of claim 1, wherein
the first sensing block comprises:
   an upper member;
   a lower member facing the upper member; and
   side members disposed between the upper member and the lower member,
the magnetic body is attached to a surface of the upper member, and
the coil is attached to a surface of the lower member.

3. The wearable device of claim 2, wherein
the upper member comprises a rigid material, and
the lower member and the side members comprise an elastic material.

4. The wearable device of claim 2, wherein
the upper member and the lower member have a substantially curved shape, and
a curvature of the upper member is different from a curvature of the lower member.

5. The wearable device of claim 2, wherein
the first sensing block further comprises a filling layer defined by the upper member, the lower member, and the side members, and
the filling layer is elastically deformable.

6. The wearable device of claim 5, wherein the filling layer is filled with a fluid.

7. The wearable device of claim 1, wherein
the coil extends in a longitudinal direction of the rod,
the coil does not contact the rod, and
the coil surrounds the rod.

8. The wearable device of claim 1, wherein
the second sensing block comprises an inertial sensor that senses an inertial signal, and
a control unit receiving a first data value sensed by the induced electromotive force sensor and a second data value sensed by the inertial sensor and outputting a third data value by combining the first data value and the second data value with a pre-stored mapping table.

9. The wearable device of claim 8, further comprising:
a connection wiring passing through the first sensing block, the connection member, and the second sensing block,
wherein the connection wiring connects the induced electromotive force sensor and the control unit.

10. The wearable device of claim 8, wherein
the second sensing block further comprises a communication unit, and
the control unit transmits the third data value to an external electronic device through the communication unit.

11. The wearable device of claim 2, wherein
the coil moves upward or downward according to a contraction or a relaxation of the lower member, and
a distance between the magnetic body and the coil changes.

12. The wearable device of claim 2, wherein
the rod is magnetic by contacting the magnetic body,
the coil moves upward or downward according to a contraction or a relaxation of the lower member, and
an induced electromotive force is generated in the coil by a change in an area of the rod overlapping the coil.

13. The wearable device of claim 1, wherein the first sensing block comprises induced electromotive force sensing modules.

14. The wearable device of claim 13, wherein magnetic bodies included in the induced electromotive force sensing modules are spaced apart from each other in a first direction and a second direction intersecting the first direction and disposed in a matrix in plan view.

15. The wearable device of claim 2, wherein
the lower member contacts a user's forearm, and
a distance between the magnetic body and the coil is changed by a contraction or a relaxation of the forearm according to the user's hand or arm movement, and
an induced electromotive force is generated in the coil.

16. A wearable device comprising:
sensing blocks comprising:
  a first sensing block; and
  a second sensing block, wherein
the first sensing block comprises:
  a magnetic body;
  a coil not contacting the magnetic body and facing the magnetic body; and
  an induced electromotive force sensor sensing an induced electromotive force generated in the coil by the coil and the magnetic body,
the second sensing block comprises a control unit, and
the control unit receives a first data value sensed by the induced electromotive force sensor and outputs a second data value by combining the first data value with a pre-stored mapping table.

17. The wearable device of claim 16, further comprising:
a connection member connecting the first sensing block and the second sensing block; and
a connection wiring passing through the first sensing block, the connection member and the second sensing block and connecting the induced electromotive force sensor and the control unit.

18. The wearable device of claim 17, wherein the control unit receives the first data value from the induced electromotive force sensor through the connection wiring.

19. The wearable device of claim 16, wherein
the second sensing block further comprises an inertial sensor that senses an inertial signal, and
the control unit receives a third data value sensed by the inertial sensor and outputs a fourth data value by combining the second data value with the third data value.

20. The wearable device of claim 19, wherein
the second sensing block further comprises a communication unit, and
the control unit transmits the fourth data value to an external electronic device through the communication unit.

* * * * *